Aug. 3, 1965
J. L. ROSENBLUM
3,198,304
MECHANICAL COUPLING DEVICE HAVING ONE WAY
CLUTCH AND SHAFT ALIGNING MEANS
Filed Dec. 13, 1962
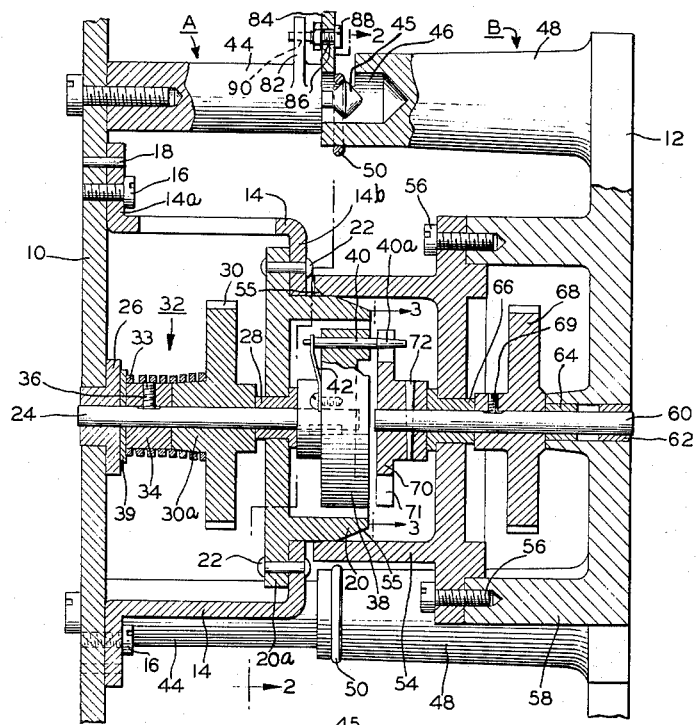
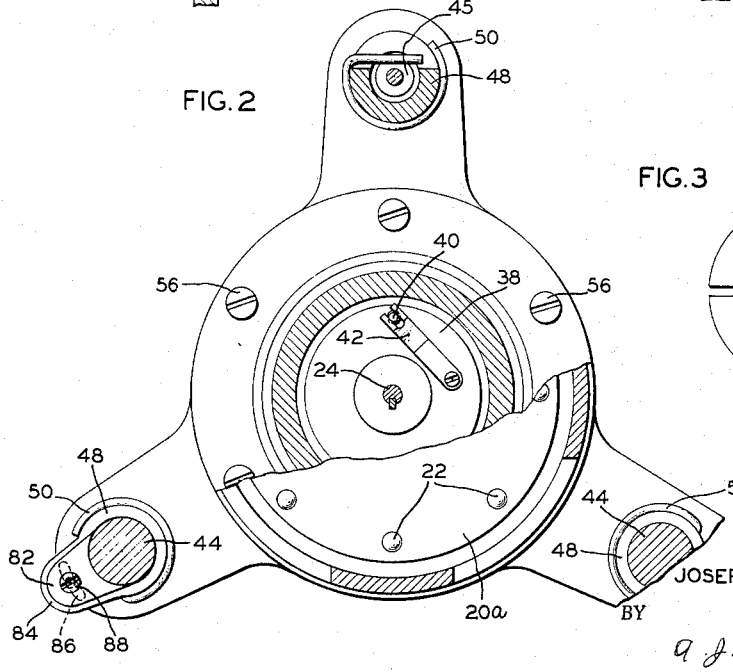
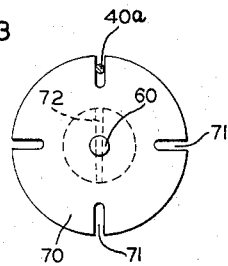
INVENTOR.
JOSEPH L. ROSENBLUM
BY
*a. J. De Angelis*
ATTORNEY

United States Patent Office 3,198,304
Patented Aug. 3, 1965

3,198,304
MECHANICAL COUPLING DEVICE HAVING ONE WAY CLUTCH AND SHAFT ALIGNING MEANS
Joseph L. Rosenblum, South Norwalk, Conn., assignor to Sperry Rand Corporation, New York, N.Y., a corporation of Delaware
Filed Dec. 13, 1962, Ser. No. 244,461
12 Claims. (Cl. 192—43)

This invention relates to mechanical coupling devices, and especially to such devices for transmitting rotary motion between two units with great precision.

Many present day mechanisms consist of two or more mechanical units operatively associated, one with the other, and powered from a common motive source through a coupling arrangement. In such coupled arrangements, it is desirable to minimize power transmission errors due to manufacturing tolerances of the coupling components and misalignments occurring during installation.

It is also sometimes desirable that the coupling arrangement not only provide for greater accuracy of power transmission from one unit, termed the driving unit, to a cooperating unit, termed the driven unit, but also enable the cooperating units to be quickly and easily coupled and uncoupled repeatedly without loss of accuracy.

In addition, it is sometimes desirable that the driven units be easily replaceable by other similar driven units without loss of accuracy in transmitting motive power thereto.

In certain coupled mechanisms, in order to obtain satisfactory performance, rotary motion must be transmitted from a driving unit to a cooperating driven unit with a preciseness usually required only of scientific instruments. For example, in microfilming machines of the rotary type, a plurality of documents are carried by a document transport at relatively high speeds past what may be termed a "photograph station" for photographing onto a roll of microfilm carried by a film transport in an associated camera. Such rotary microfilming machines usually employ "slit photography" principles, requiring a precise and uniform ratio between the document and film velocities. Such machines may be classified as scientific instruments whose performance is directly related to the accuracy with which the film and document velocity ratio is maintained uniform.

In such machines, the film transport is powered from the document transport. The coupling therebetween, therefore, must provide a precise and uniform velocity ratio between the speeds of travel of the documents and film to obtain satisfactory performance. In addition, great versatility is required, such that various universal cameras, each having different lenses or film sizes may be quickly coupled to the driving unit (document carrier), one at a time, with automatic alignment therebetween for precise performance. Furthermore, the coupling must allow limited relative movement between the film and document transports for proper alignment of the optical path extending from the film to the document.

It is also desirable that the coupling device be constructed in such maner as to permit the driven mechanism to be powered alternately from a source other than the driving machine to which it is coupled without transmitting motion to the driving machine. For example, in microfilming machines, it is often necessary to wind film onto a "take up" reel, necessitating independent rotation of the driven mechanism while leaving the document to be photographed undisturbed.

It is, therefore, an object of this invention to provide an improved mechanical coupling device for transmitting motion from a driving to a driven unit with maximum accuracy.

A further object is to provide such a coupling device which permits repeated quick coupling and uncoupling of the two cooperating mechanisms with automatic alignment therebetween without loss of accuracy in power transmission between the mechanisms.

Another object is to provide a coupling device which effects precise motive power transmission between any pair of duplicate driven and driving mechanisms.

It is still another object to provide a mechanical coupling device for transmitting rotary motion between two mechanisms with great accuracy, while allowing independent powering of the driven mechanism from another motive power source and preventing transmission of such independent motion to the driving mechanism.

In carrying out the invention, according to a preferred embodiment thereof, which will be described in detail hereinafter, the driven unit is detachably mounted onto the driving unit in such manner as to permit movement of the driven unit in relation to the driving unit in all directions except axially. The mechanism for positively but releasably coupling the two shafts together includes two concentric hubs arranged for mating overlapping engagement, one to the other, one hub being fixed to the frame of the driving unit and the other being fixed to the frame of the driven unit. The hubs support and accurately align a driving shaft and a driven shaft; the adjacent ends of which protrude through their respective hubs into a cavity defined by the mated hubs. Nested within the cavity formed by the two mating concentric hubs are two discs, a driving disc, keyed to the end of the driving shaft, and a driven disc, keyed to the end of the driven shaft. The driven disc is provided with a plurality of radial slots for receiving a tapered axially yieldable crank pin mounted onto the driving disc for precise concentric rotation with the driving disc. Such tapered pin is spring biased for projection into the slots defined in the driven disc. Upon rotation of the driving disc, the tapered pin is urged into the first slot at which it arrives, becoming wedged therein, thereby automatically coupling the driving shaft to the driven shaft, and preventing any loss of motion through back lash.

The driving shaft receives power from a drive gear through an over-running clutch. A portion of a coil spring encircles and frictionally engages a hub formed on the driving gear. Another portion of the spring loosely encircles the driving shaft and is prevented from rotation. Rotation of the driving gear in one direction constricts the spring, causing it to grasp the driving shaft and transmit the gear rotational motion to the driving shaft, and, thence, through the crank pin to the driven shaft. Rotation of the drive gear in the opposite direction allows the driving gear to rotate independently of the driving shaft. The clutch also permits the driven shaft to be independently rotated without transmitting such rotational motion to the drive gear.

With the subject arrangement, the driven mechanism may easily be coupled and uncoupled from the driving mechanism, and duplicate driven mechanisms may be quickly coupled to the driving mechanism with automatic precise alignment therebetween for accurate transmission of rotary motion from the driving to the driven unit.

Features and advantages of the invention will be seen from the above, from the following description of the preferred embodiment when considered in conjunction with the drawing, and from the appended claims.

In the drawing:

FIG. 1 is a simplified schematic, cross-sectional view with portions broken away of a mechanical coupling device, embodying the invention;

FIG. 2 is a cross-sectional view taken along the line 2—2 of FIG. 1; and

FIG. 3 is a cross-sectional view taken along the line 3—3 of FIG. 1, illustrating the driven disc 70 and yieldable crank pin 40.

For convenience, the invention will be described for coupling, in a microfilming machine, a document transport, as the driving mechanism, to any one of several universal cameras for precise transmission of motion to the film transport of the coupled camera; it being understood, nevertheless, that without departing from the scope of the invention the coupling mechanism may be utilized to transmit motion between a variety of other driving and driven mechanisms requiring preciseness and uniformity of motion transmittal.

Referring to FIG. 1, 10 generally designates a portion of the framework of the document carrier (not shown) of a rotary microfilming machine, and 12 generally designates a portion of the framework of an associated universal rotary camera (not shown). Documents to be copied photographically are carried past an exposure station by the carrier for filming by the camera onto microfilm at relatively high speeds. The camera obtains its motive power from driving mechanism of the microfilming machine through a coupling device for providing a precise and uniform velocity ratio between the speed of travel of the document to be photographed and the film.

The coupling device consists of two complimentary portions, generally designated A and B; portion A being mounted on framework 10 of the microfilming machine, while its cooperating portion B is mounted on framework 12 of the rotary camera; the portions being shown in coupled condition.

Coupling portion A includes a hollow cylindrical mounting member 14 open at both ends and having outwardly disposed attaching flange 14a at its inner end and inwardly disposed attaching flange 14b at the other end. Member 14 is secured at its inner end to frame 10 of the microfilming machine by means of screws 16 and dowel pins 18 passing through holes defined in attaching flange 14a. A concentric hub 20 having an outwardly disposed attaching flange portion 20a is riveted at 22 to inwardly disposed attaching flange 14b of member 14. A driving shaft 24 is rotatably mounted at its inner end in frame 10 by means of bearing 26, and near its outer end in hub 20 by means of bearing 28; the outer end of shaft 24 protruding into the cavity defined by the hub. The dowel and screw fastening of mounting member 14 onto frame 10 permits precise alignment of bearings 26 and 28, one to the other, to accurately align driving shaft 24, and ready disassembly of the coupling mechanism for servicing.

A driving gear 30 is rotatably mounted on driving shaft 24, intermediate bearings 26 and 28. Gear 30 receives motive power for transmission to driving shaft 24 through an over-running clutch, generally designated 32, from an electric motor (not shown) and gearing (not shown) of the microfilming machine; cut outs being provided in mounting member 14 for placing such gearing in engagement with gear 30.

Over-running clutch 32 includes a coil spring 33, a portion of which spring loosely encircles a bushing 34 keyed at 36 to driving shaft 24. The remaining portion of spring 33 encircles and is closely fitted over a tapered hub 30a formed integral with gear 30. Spring 33 is maintained under compression, and is retained against rotational movement about bushing 34 by a washer 39 mounted on shaft 24 between bearing 26 and the inner end of spring 33; the surface of washer 39 abutting spring 33 being of frictional material.

Driven movement of gear 30 in a predetermined direction through frictional engagement of spring 33 on tapered hub 30a of gear 30 causes spring 33 to constrict, increasing the frictional engagement therebetween. As spring 33 constricts, it grips bushing 34 (keyed to shaft 24) locking bushing 34 and, in turn, driving shaft 24 to driving gear 30. Continued rotation of gear 30 in such spring constricting direction is transmitted to driving shaft 24. Spring 33, preferably, is of the type composed of wire having a rectangular cross section of for greater frictional engagement between the spring, bushing 34, and hub 30a of gear 30. Rotational of gear 30 in a direction opposite to such spring constricting direction avoids constriction of spring 33 and allows the gear to rotate loosely on shaft 24 in uncoupled relation to spring 33.

With this arrangement, rotary motion may be transmitted from gear 30 to shaft 24 in only one direction, while gear 30 may be freely rotated in a direction opposite thereto. Likewise, shaft 24 may be freely rotated in either direction without transmitting its motion to spring 33 (loosely encircling bushing 34) and gear 30.

Keyed to the protruding outer end of shaft 24, within the confines of hub 20, is a circular driving disc 38. A crank pin 40 is mounted for axial movement in driving disc 38. Pin 40 is positioned at a predetermined distance from the center of rotation of the disc, and is urged by spring 42 axially to a position where a portion 40a of pin 40 protrudes beyond the outermost end of shaft 24. The protruding portion 40a is tapered for wedged engagement in one of several radial slots 71 (FIG. 3) defined in a driven disc 70 of coupling portion B for detachably but securely coupling driving disc 38 to driven disc 70, as will be explained hereinafter.

Three supporting posts 44 spaced approximately 120° apart (FIG. 2) are each attached at one end to framework 10 (FIG. 1) of the microfilming machine and protrude thereform for mounting coupling portion B carried by the rotary camera (not shown) onto framework 10. Formed at the unattached end of each post 44 is a oval shaped protruding member 45 adapted for insertion into an associated oversized socket 46 defined in corresponding supporting posts 48 protruding from and formed integral with frame 12 of the rotary camera. Each oval shaped member 45 is retained in its respective oversized socket 46 by means of a D-shaped spring clip 50 inserted in the socket end of post 48 for frictional engagement with the underside of oval member 45. This mounting arrangement permits rotational movement of frame 12 and its associated coupling portion B relative to frame 10 and its associated coupling portion A for fine alignment of the optical path extending between the film and document, while preventing axial movement of the coupling portions relative to each other. In addition, this mounting arrangement provides for quick detachment and attachment of the rotary camera to the microfilming machine framework 10.

Coupling portion B includes a cylindrical hollow hub member 54 open at its outer end and attached at the other end by means of screws 56 onto a protruding cylindrical supporting portion 58 of camera framework 12. Hub member 54 is machined at its inside surface to a close precise mating fit over the outside surface of hub 20. It may also be noted that the outermost edges of overlapping hubs 20 and 54 are tapered at 55 for easy insertion into the overlapping position shown. A driven shaft 60 is rotatably mounted at one end to camera framework 12 by means of bearings 62 and 64, and near the other end is rotatably mounted to hub member 54 by means of bearing 66; such other end of driven shaft 60 extending through bearing 66 into the inside cavity of hub member 54.

A driven gear 68 is locked by means of set screw 69 to driven shaft 60 intermediate bearings 64 and 66 for transmitting rotative motion of driven shaft 60 to the film transport (not shown) of the camera. A driven disc 70 is secured to the outermost protruding end of driven shaft 60 by means of a pin 72. Defined in disc 70 are a plurality of radial slots 71 (FIG. 3) extending from the disc periphery towards its axis of rotation a predetermined distance for receiving the tapered end 40a of crank pin 40 carried by driving disc 38 (FIG. 1) of coupling portion A. Slots 71 are dimensioned in width to provide a tight "wedge" fit for tapered end 40a of pin 40 when the pin is urged into a slot 71, to prevent lost motion or "play" between driven member 70 and driving member 38.

When it is desired to couple a universal rotary camera onto the microfilming machine, hub 54 carried by the camera is slid into overlapping engagement with hub 20 carried by the machine, thereby, precisely aligning driven shaft 60 of the camera with driving shaft 24 of the machine. The camera is then removably attached to posts 44 of framework 10 of the machine by means of the aforementioned cooperating oval shaped members 45, sockets 46 and spring clips 50 which permit limited rotational relative movement of the coupled units for alignment of the aforementioned optical path. When rotated into proper position, the camera, if desired, may be locked in position by means of radially extending brackets 82, 84, extending from supporting posts 44, 43, respectively, and fastener 88 extending through an arcuate slot 86 defined in bracket 84 and a hole 90 defined in bracket 82.

Assume that driven motion is imparted to driving gear 30 by the microfilming machine motor (not shown). Such rotary motion is transmitted by the constriction of coil spring 33 of clutch 32, as has been previously described, to driving shaft 24. As driving disc 38 keyed to the outer end of driving shaft 24 rotates, spring biased pin 40 arrives at a slot 71 in driven disc 70 and is urged therein by its spring 42; the tapered portion 40a of the pin becoming wedged tightly into the slot, thereby, automatically and securely coupling driving shaft 24 to driven shaft 60. Rotation of driven shaft 60 is transmitted through driven gear 68 to the film transport (not shown) of the camera for driving the film at a precise and uniform velocity.

Next assume that it is desired to rotate driven gear 68, while the camera is coupled to the microfilming machine, as, for example, in order to take up film, without disturbing the document transport. Gear 68 may be independently rotated in either direction, rotating driven shaft 60, and through tapered crank pin 40 in engagement with driven disc 70 also rotating driving shaft 24. As driving shaft 24 is thus rotated, bushing 34 secured thereto rotates freely within loose fitting coil spring 33 of over-running clutch 32, preventing transmission of the shaft motion to driving gear 30, thereby leaving the film transport undisturbed.

In addition, with the subject coupling arrangement, over-running clutch 32 permits rotation of driving gear 30, if desired, in a direction opposite to its normal spring constricting direction without imparting such motion to driven gear 68.

With the subject coupling arrangement, a variety of similar universal rotary cameras may be repeatedly coupled and uncoupled easily and quickly to a microfilming machine. Initial driven motion of driving gear 30 automatically couples the driving unit to the driven unit for driving the film and document at uniform and precise velocity ratios. The subject coupling mechanism is of simple construction for ease of manufacturing, may be employed on a variety of devices requiring precise transmission of rotary motion and may be quickly disassembled for serving.

As changes can be made in the above described construction and many apparently different embodiments of this invention can be made without departing from the scope thereof, it is intended that all matter contained in the above description or shown on the accompanying drawing be interpreted as illustrative only and not in a limiting sense.

What is claimed is:

1. A device as for coupling a drive shaft of a first unit to a driven shaft of a second unit, said device comprising; a first shaft aligning member secured to said first unit; a second shaft aligning member secured to said second unit; said members being configured and positioned for mating engagement one with the other to precisely align said shafts, one with the other, and prevent radial movement therebetween; means operative for automatically and releasably securing said aligned shafts to each other for bi-directional rotational movement in unison, said shaft securing means being actuated to securing condition upon initial bi-directional rotative movement of said shafts with respect to each other; means for releasably attaching said units to each other, said attaching means comprising at least one attaching member protruding from one of said units, said other unit having defined therein an associated socket dimensioned to loosely receive said attaching member, said attaching member having a necked down portion extending into said socket, and a spring removably mounted onto said other unit and having a portion extending into said socket and said necked down portion of said attaching member releasably locking said member from movement out of said socket.

2. A device for coupling a driving shaft of a first unit to a driven shaft of a second unit, said device comprising; a first shaft aligning member secured to said first unit; a second shaft aligning member secured to said second unit; said members being configured and positioned for mating engagement one with the other to precisely align said shafts, one with the other, and prevent radial movement therebetween; means operative for automatically and releasably securing said aligned shafts to each other for bi-directional rotational movement in unison, said shaft securing means being actuated to securing condition upon initial bi-directional rotative movement of said shafts with respect to each other; a driving gear rotatively mounted onto said driving shaft, and an over-running clutch for establishing driving engagement of said driving gear with said driving shaft only under conditions where said driving gear is driven in a certain direction.

3. A device for transmitting rotary motion from gearing of a driving unit to gearing of a driven unit, said device comprising; a driving shaft rotatably mounted at one end to said driving unit; a driven shaft rotatably mounted at one end to said driven unit; a pair of cooperating shaft supporting members, one mounted on said driving unit and rotatably supporting the other end of said driving shaft, and the other mounted on said driven unit and rotatably supporting the other end of said driven shaft, said members being adapted for mating engagement one with the other by axial movement towards each other, said members being configurated for preventing, when in engaged condition, radial movement of said units with respect to each other and being slidably detachable by axial movement apart from each other, said members when in mating engagement defining a cavity therebetween; the other ends of said shafts protruding through their respective associated supporting members into said cavity, and means mounted on said protruding shaft ends for releasably securing said shafts to each other upon initial rotation of either of said shafts.

4. A device as set forth in claim 3 wherein said releasable shaft securing means includes a driven disc secured to said protruding end of said driving shaft for rotation therewith, a driving disc secured to said protruding end of said driven shaft for rotation therewith, a crank pin slidably mounted in one of said discs for axial movement toward said other disc, said other disc having an aperture defined therein for receiving said pin, and a spring biasing said pin into said aperture for releasably securing said shafts to each other upon relative rotative movement of said pin into alignment with said aperture.

5. A device as set forth in claim 3 wherein said pair of cooperating shaft supporting members comprise a pair of hollow cylindrical members open at one end and dimensioned at their respective other ends for precise overlapping mating engagement when moved axially towards each other.

6. A device as set forth in claim 3 wherein are included a driving gear rotatably mounted on said driving shaft and having an axially extending tapered hub portion, a coil spring having a first portion encircling said driving shaft and another portion encircling and frictionally engaging said hub portion, and means retaining said first spring portion against rotative movement relative to said driving gear and under compression, said frictional engagement being predetermined as sufficient to cause, under conditions where said driving gear is rotated in the direction in which said spring is coiled, sufficient constriction of said spring to cause said spring to grasp said driving shaft to transmit rotative movement of said driving gear in said direction to said driving shaft.

7. A device for coupling a driving unit to a driven unit comprising, a driving shaft rotatably mounted on said driving unit with an attaching end protruding therefrom; a driven shaft rotatably mounted on said driven unit with an attaching end protruding therefrom; a pair of non-rotatable shaft aligning members, one secured to each of said units, said aligning members being configured and disposed for mating engagement, one with the other, under conditions where said units are moved axially towards each other; said aligning members being fixedly positioned on their respective units to precisely align, under conditions where said members are engaged, said shafts, one to the other, and placing said shaft attaching ends adjacent each other; a driving disc secured to the protruding end of said driving shaft; a driven disc secured to the attaching end of said driven shaft; and axially disposed crank pin slidably mounted in one of said discs; said other disc having defined therein at least one crank pin receiving aperture, a spring biasing said pin for projection of a portion thereof into said aperture for coupling said shafts to each other for rotative movement in unison under conditions where said aligning members are placed in mating engagement and said shafts are initially rotated relative to each other.

8. A coupling device as set forth in claim 7 wherein said portion of said crank pin is tapered and said aperture is dimensioned with respect to said tapered portion to provide a wedge frictional engagement between said pin and said other disc under conditions where said pin is urged into said aperture.

9. A device as set forth in claim 7 wherein are included a driving gear rotatably mounted on said driving shaft and having an axially extending tapered hub portion, a coil spring having a first portion encircling said driving shaft and another portion encircling and frictionally engaging said tapered hub portion, and means retaining said first spring portion against rotative movement relative to said driving gear and under compression, said frictional engagement being predetermined as sufficient to cause, under conditions where said driving gear is rotated in the direction in which said spring is coiled, sufficient constriction of said spring to cause said spring to grasp said driving shaft to transmit rotative movement of said driving gear in said direction to said driving shaft.

10. A device for transmitting rotary motion from a first unit to a second unit, comprising a driving shaft rotatably mounted on said first unit and having an attach-end protruding therefrom; a driven shaft rotatably mounted on said second unit and having an attaching end protruding therefrom; means for releasably mounting one of said units onto the other of said units for alignment of said units, said releasable mounting means being constructed to permit limited rotational movement of said units with respect to each other and prevent axial movement therebetween; a pair of cooperating shaft aligning members, one mounted on said first unit and the other mounted on said second unit, said members being configured for mating engagement with each other preventing radial movement therebetween under conditions where said shafts are moved axially towards each other, said members being positioned on their respective units in spatial relation to their respective shafts predetermined to precisely align said shafts with respect to each other while permitting axial movement therebetween, and means for releasably securing said shafts, one to the other, said shaft securing means being operative from a non-securing condition to a shaft securing condition upon initial rotative movement of said shafts relative to each other.

11. A device as set forth in claim 10 wherein said releasable mounting means includes at least one oval shaped member protruding from one of said units, said other unit having defined therein a corresponding socket dimensioned for loosely receiving said ball shaped member, and spring means cooperating with said ball shaped member and socket for retaining said member in said socket against axial movement therebetween.

12. A device as set forth in claim 10 wherein are included means for locking said units in a predetermined mounted position against relative rotational movement therebetween.

References Cited by the Examiner

UNITED STATES PATENTS

| | | | |
|---|---|---|---|
| 1,372,675 | 3/21 | Davis. | |
| 2,110,493 | 3/38 | Wittel | 192—115 |
| 2,816,535 | 12/57 | Sells | 192—67 |
| 2,881,626 | 4/59 | Morris | 74—325 |
| 3,132,731 | 5/64 | Shipley | 192—67 |

DAVID J. WILLIAMOWSKY, *Primary Examiner.*